United States Patent [19]

Heuser

[11] 3,731,562
[45] May 8, 1973

[54] RECESSING TOOL

[75] Inventor: Helmut C. Heuser, Birmingham, Mich.

[73] Assignee: Bokum Tool Company, Inc., Madison Heights, Mich.

[22] Filed: Apr. 5, 1971

[21] Appl. No.: 130,883

[52] U.S. Cl. ...................... 82/1.2, 82/24 A, 408/150
[51] Int. Cl. ............................................. B23b 41/00
[58] Field of Search ................. 82/1.2, DIG. 3, 24 A, 82/11; 408/150, 151, 154–156

[56] References Cited

UNITED STATES PATENTS

| | | | |
|---|---|---|---|
| 2,521,619 | 9/1950 | Weld | 82/DIG. 3 |
| 2,182,770 | 12/1939 | Woodcock | 82/1.2 |

FOREIGN PATENTS OR APPLICATIONS

| | | | |
|---|---|---|---|
| 1,066,329 | 4/1967 | Great Britain | 82/DIG. 3 |

*Primary Examiner*—Leonidas Vlachos
*Attorney*—Whittemore, Hulbert & Belknap

[57] ABSTRACT

A recessing tool for forming an annular recess within a cylindrical opening in a workpiece, intended for use on an automatic screw machine, having a holder, a cam body carried by said holder for relative angular movement about an axis parallel to but displaced from the axis of relative rotation between the holder and work piece and for relative axial movement between the holder and cam body. Cam means are interposed between said holder and cam body effective upon relative axial displacement therebetween to produce relative angular movement therebetween, and means for effecting longitudinal movement of the holder to project a recessing tool carried by the cam body into a cylindrical opening in a work piece. A drawbar is connected to the cam body and abutment means acting between the drawbar and the support for the holder arrests forward movement of the cam body while the holder continues to move in a direction parallel to the axis of the bore in the work piece. This displaces a recessing tool carried by the cam body outwardly of the axis of relative rotation between the holder and work piece, due to the eccentric relationship of the cam body relative to such axis.

3 Claims, 6 Drawing Figures

PATENTED MAY 8 1973

INVENTOR.
Helmut C. Heuser.
BY Whittemore,
Hulbert & Belknap
ATTORNEYS

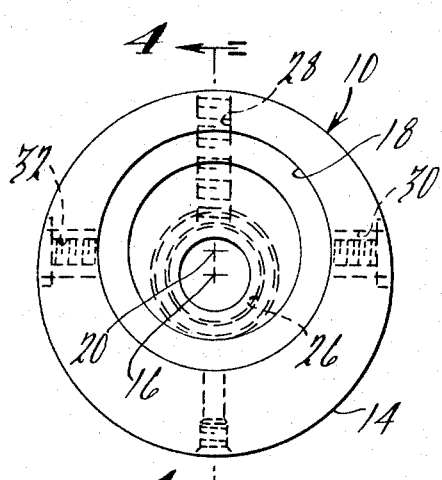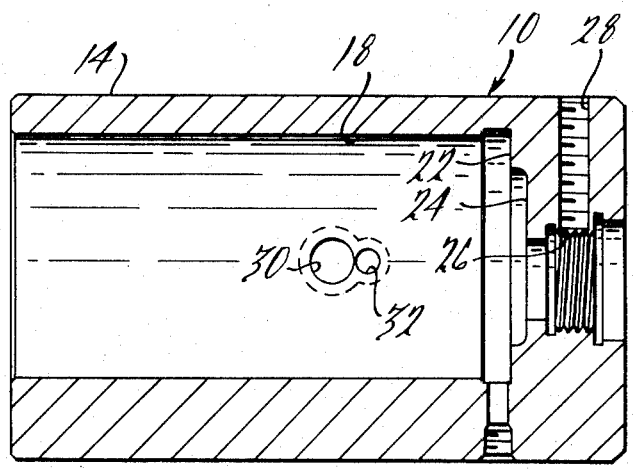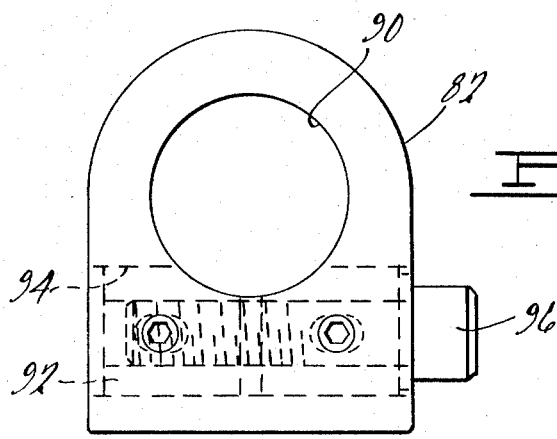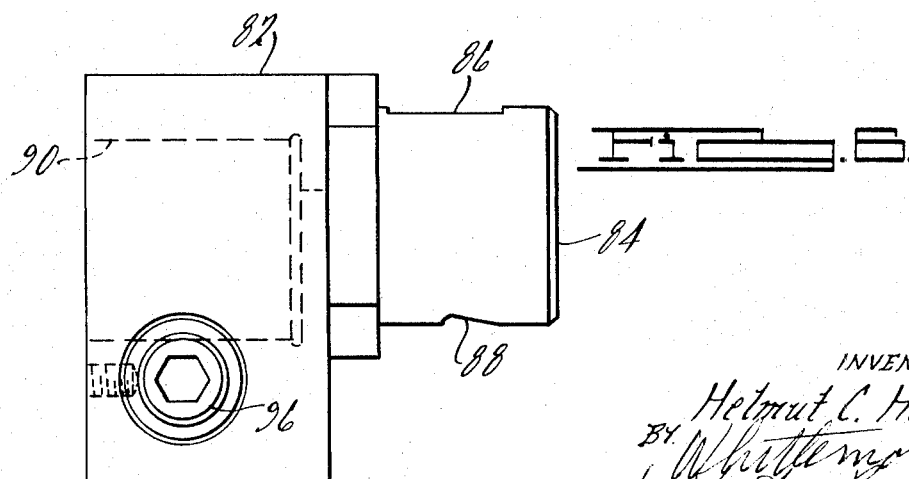

RECESSING TOOL

BRIEF SUMMARY OF THE INVENTION

The present invention relates to a recessing tool intended to cut an annular recess within a cylindrical opening in a work piece. The recessing tool is primarily designed for use on a multiple spindle screw machine in which a multiplicity of work pieces are acted on simultaneously at different stations to perform different operations. Accordingly, chips from other operations may be present in the cutting zone in which the recessing tool is to operate.

In the operation the work pieces are continuously driven in rotation. In a typical operation the work pieces may be tubular and are indexed between successive operations. The recessing tool assembly is mounted on a slidable support so as to move the recessing tool into the cylindrical housing or bore provided in the rotating work piece. The assembly comprises a holder having a cylindrical opening parallel to but displaced laterally from the axis of relative rotation between the holder and tube, or specifically, the axis of rotation of the tube. The cam body carries a cutting tool, the cutting portion of which is located laterally from the axis of rotation of the cam body relative to the holder. Accordingly, as the cam body is rotated, the cutting portion of the recessing tool is displaced outwardly from the axis of rotation of the tube so as to cut an annular recess therein to a required depth.

In order to determine the location and depth of recess, a drawbar is connected to the cam body and an abutment is provided on the support for the holder engageable with a cooperating stop or abutment on the drawbar. Accordingly, as the holder is advanced to project the recessing cutter into the bore of the work piece or tube, engagement between the abutments terminates further movement of the recessing cutter axially of the work piece and hence, determines the location of the recess. Continued forward movement of the holder results in rotation of the cam body about its eccentric axis with corresponding outward displacement of the cutting element. Suitable stop means are provided to limit forward movement of the holder, thus determining the depth of cut.

The drawbar extends outwardly from the remainder of the recessing tool assembly and hence, may occupy a zone free from chips which might otherwise affect either the location or depth of the recess formed by the tool.

BRIEF DESCRIPTION OF THE DRAWINGS

FIG. 3 is an end view of the holder body.

FIG. 4 is a sectional view on the line 4—4, FIG. 3.

FIG. 5 is an end view of a tool adapter which may be used with the assembly.

FIG. 6 is a side view of the adapter.

DETAILED DESCRIPTION

Figure 1:
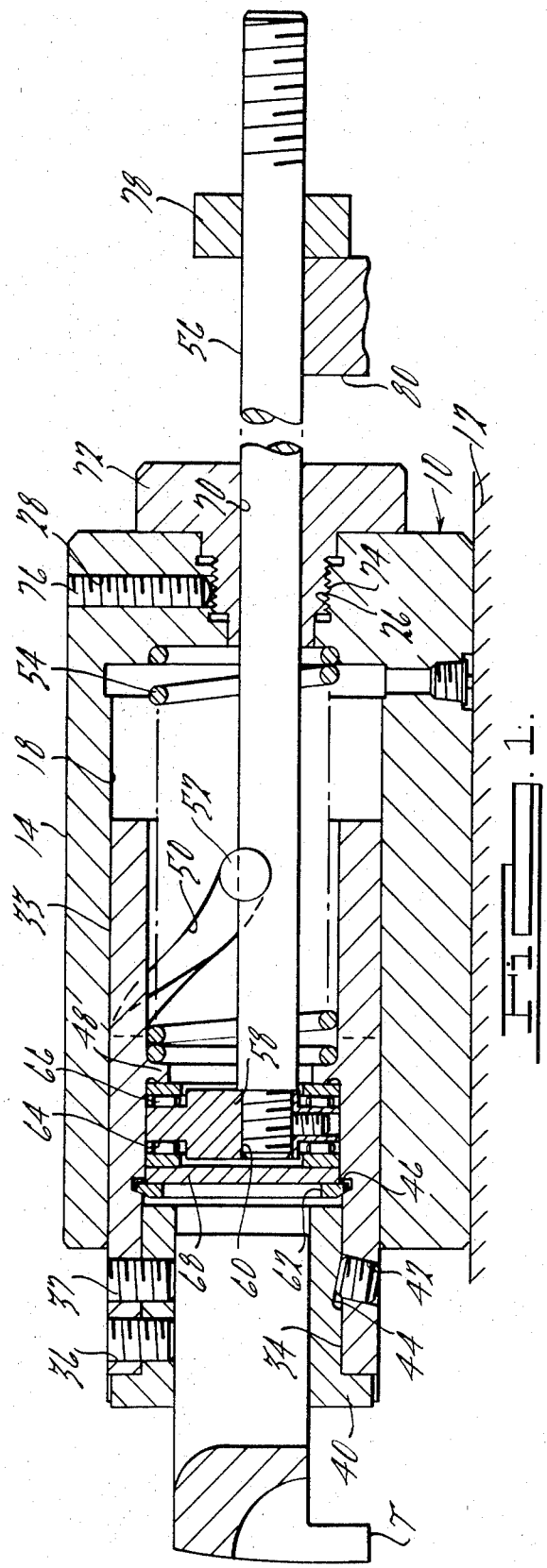
FIG. 1 is a longitudinal section through the recessing tool.
Figure 2:
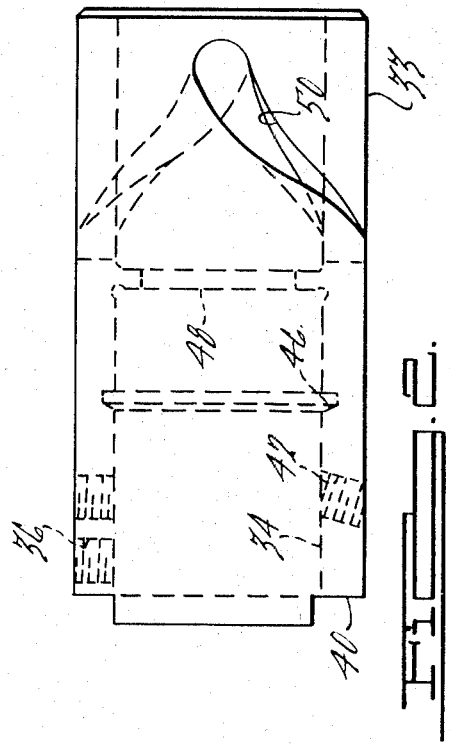
FIG. 2 is an elevational view of the cam body.

Referring first to FIGS. 1 and 2 the assembly comprises a holder or holder body 10 mounted for movement axially thereof relative to a work piece having a cylindrical opening or bore to be internally recessed. The means for effecting axial movement of the holder is diagrammatically indicated at 12, which may be considered as a part of a slide movable in a direction parallel to the axis of the rotating work piece on a multiple station automatic screw machine.

Referring to FIGS. 3 and 4 the holder is illustrated as having an external cylindrical surface 14 the axis of which is indicated at 16, this axis being coincident with the axis of rotation of the work piece, or more generally, the axis of relative rotation between the work piece and the holder 10. The holder 10 is provided with an internal cylindrical bore 18 the axis of which is indicated at 20, for the reception of a cam body as will subsequently be described. The bore 18 terminates in radially extending wall portions 22 and 24, provided with a stepped opening including an intermediate threaded portion 26. The holder 10 is provided with a deep tapped opening 28 and a pair of counterbored openings 30 for the reception of cam pins. Adjacent each of the counterbored openings 30 there is provided a tapped and counterbored opening 32 for the reception of locking screws for retaining cam pins in position.

The cam body 33, best illustrated in FIG. 2, is of cylindrical external configuration as illustrated, and includes a cylindrical recess 34 at one end for the reception of a recessing tool or tool adapter. Extending through the wall of the cam body 33 are a pair of threaded openings 36 for the reception of set screws 37 adapted to extend through openings in a holder 40 and to engage the flat surface of the shank of a recessing tool. The cam body 33 also includes a slightly inclined tapped opening 42 for the reception of a set screw adapted to engage a flat surface 44 provided on the holder 40.

Within the cylindrical bore 34 there is provided an annular recess 46 for a purpose which will presently be described, and inwardly of the annular recess 46 there is provided a radially inwardly extending flange or wall 48.

Located beyond the radially extending wall 48 are a pair of diametrically opposed inclined cam slots 50 which as best seen in FIG. 2, are of 90° circumferential extent.

Referring now more specifically to FIG. 1, it will be observed that the cam body 33 is received in the cylindrical bore 18 of the holder 10 and except for cam means subsequently to be described, is movable both longitudinally and circumferentially of the bore.

Extending through the openings 30 in the holder 10 are cam pins 52 the inner ends of which extend into the helically formed cam slots 50. The pins are retained in position by means of lock screws received in the threaded openings 32. Accordingly, as the cam body 33 is forced to move longitudinally of the bore 18 of the holder 10, the coaction between the pins 52 and the cam slots 50 results in a corresponding rotational movement of the cam body.

A coil compression spring 54 is provided acting between the cam body 33 and the holder 10 and urging the cam body 33 to the left relative to the holder, as viewed in FIG. 1.

A drawbar 56 is connected to the cam body 33 and for this purpose there is provided a drawbar adapted 58 having a threaded opening 60 into which the inner threaded end of the adapter is fixed. The drawbar adapter 58 is positioned between a split ring 62 located in the annular recess 46 and the radially inwardly projecting flange 48. It includes a peripheral reduced portion 64 provided with opposed bearing devices indicated generally at 66. A spacer 68 is provided intermediate the ring 62 and the drawbar adapter 58.

The drawbar extends through a cylindrical opening 70 provided in a drawbar support 72, the support having an intermediate threaded portion 74 engageable with the threaded portion 26 of the holder 10. The support 72 is retained in assembled rotation by an elongated lock screw 76.

Located on the drawbar 56 is a stop or abutment 78 which coacts with an abutment 80 provided on the support for the holder 10. The abutment 78 may be adjustable on the drawbar or the abutment 80 may be adjusted on the machine, but in any case, adjustment means are provided so that movement of the drawbar, and hence the cam body 33, to the left are arrested upon engagement between the abutments 78 and 80.

The forward end of the cam body 33 is provided with the cylindrical bore 34 previously described, and is adapted to receive the tool holder 40. The tool T has its shank received in the holder 40 and firmly interlocked therein by the set screws 37. Accordingly, the cam body 33, slot 40 and the tool T constitute a rigid unitary assembly in operation.

In operation the compression spring 54 retains the cam body 33 to the left relative to the holder 10, this position being determined by engagement between the ends of the cam pins 52 and the right hand end of the inclined camming slot 50 as viewed in FIG. 1. This position of the cam body relative to the holder also of course determines its regular position relative thereto, and hence, the radial extension of the outermost portion of the cutting tool T with respect to the axis of the work piece. In operation, the parts are arranged so that upon initial advance of the holder 10 to the left as seen in FIG. 1, the cutting tool T is in clearance with respect to the rotating work piece. As the holder 10 is advanced, the tool T moves into the cylindrical bore in the work piece until the abutments 78 and 80 prevent further movement of the drawbar and hence, of the cam body which is connected thereto. This locates the position of the recess axially of the bore of the work piece. Further movement of the holder 10 results in relative axial movement between the holder and the cam body and this in turn, due to the helically inclined cam slots in the cam body, results in rotation of the cam body about the eccentric axis 20 with the result that the recessing tool is caused to move outwardly of the axis of the work piece so as to initiate a recessing cut to extend the depth of this cut so long as the holder 10 continues to move to the left. The depth of the recess is of course determined by discontinuing advancing movement of the holder. The recessing tool is withdrawn by first moving the holder to the right, at which time the spring 54 retains the cam body in forward position while permitting rotation thereof, and continued movement of the holder completes retraction of the recessing cutter inwardly, followed by withdrawal thereof from the bore of the work piece.

Referring now to FIGS. 5 and 6 there is illustrated an adapter 82 having a shank 84 provided with a flat surface 86 for engagement by the screws 37. The shank 84 is further provided with an inclined flat surface 88 engageable in the set screws received in the inclined threaded opening 42. The adapter 82 includes a cylindrical recess 90 for receiving the cylindrical shank of a tool (not illustrated), and in order to retain the tool firmly in position in the adapter a pair of internally threaded shoes 92 are provided which are longitudinally slidable toward and away from each other in a suitably shaped transverse passage 94 provided in the adapter. A clamping screw 96 has threaded engagement with the shoes, the threads being arranged such that rotation of the screw 96 in one direction causes the shoes 92 to approach and to clampingly engage the cylindrical shank of a tool located in the recess 90.

What I claim as my invention is:

1. A recessing tool assembly for use in an operation in which relative rotation is established between a work piece having a cylindrical opening and a holder body about the axis of the opening in the work piece, in which the holder is relatively movable with respect to the work support along a path parallel to the axis of the opening, said holder having a cylindrical opening whose axis is parallel to but offset from the axis of relative rotation between the holder and the work piece, an elongated cam body longitudinally slidable and rotatable in the cylindrical opening in said holder, cam means acting between said holder and cam body and operable to effect rotation of said cam body relative to said holder upon longitudinal movement therebetween, said cam means comprising opposed helical slots in said cam body and radially inwardly projecting carried by said holder and projecting into said slots, means on said cam body for for supporting a recessing tool which extends beyond one end of said holder for insertion into the cylindrical opening in the work piece and which as a result of the eccentricity of the cam body with respect to the axis of the opening in the work piece is adjusted to cut a recess to different depths in the interior of the work piece by relative rotation between the holder and cam body resulting from relative longitudinal movement therebetween, an elongated drawbar connected at its inner end to said cam body, said cam body being tubular, an adapter within said cam body connected to said drawbar, and forming the connection between said drawbar and cam body, bearing means acting between said adapter and cam body providing for rotation therebetween while preventing relative movement longitudinally of said cam body and abutment means operable on a portion of said drawbar remote from the cutting zone of the recessing tool to arrest longitudinal movement of said cam body while providing for cutter adjusting rotation thereof upon continued movement of said holder toward the work piece.

2. A tool assembly as defined in claim 1 comprising resilient means within said cam body extending beyond an end thereof into engagement with said holder to bias said cam body in a direction to retract the recessing cutter.

3. A recessing tool assembly for use with a multiple spindle screw machine in an operation in which a recessing tool is fed into the open end of a rotating tubular work piece to a fixed location axially of the work piece and is then displaced outwardly from the axis of the work piece, composed of three relatively movable sub-assemblies; the first sub-assembly comprising a holder body movable axially of work piece and having a continuous opening extending therethrough from end to end and having a cylindrical chamber, constituting a part of said opening and extending to one end of said holder body, said holder body having pin means extending radially into said chamber; the second of said sub-assemblies comprising a cam body having a cylindrical exterior rotatably and slidably received in said chamber, said cam body having helically disposed slot means cooperating with said pin means to provide for rotation of said cam body relative to said holder body upon relative axial displacement therebetween and a recessing tool fixed to said cam body and having a radially outwardly extending cutting portion angularly adjustable in a circular path relative to said holder body to position the cutting portion in position to cut an annular groove or recess in a work piece to predetermined depth, the third of said sub-assemblies comprising elongated drawbar means extending through the end of the opening in said holder body remote from said chamber and having its inner end connected to said holder body to provide for relatively rotational movement while preventing relative axial movement therebetween, said drawbar extending substantially beyond the end of said holder body to a zone substantially free of chips and being there provided with an abutment adapted to engage with a fixed abutment to precisely located the cutting location of said tool upon movement of said holder body toward the work piece to introduce the recessing tool into the open end of the work piece.

* * * * *